United States Patent
Wright et al.

(10) Patent No.: US 9,187,029 B2
(45) Date of Patent: Nov. 17, 2015

(54) SYSTEM AND METHOD FOR CONTROLLING EXTERIOR VEHICLE LIGHTS ON MOTORWAYS

(71) Applicant: Gentex Corporation, Zeeland, MI (US)

(72) Inventors: David J. Wright, Grand Rapids, MI (US); David M. Falb, Grand Rapids, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 14/503,986

(22) Filed: Oct. 1, 2014

(65) Prior Publication Data
US 2015/0091439 A1  Apr. 2, 2015

Related U.S. Application Data

(60) Provisional application No. 61/885,126, filed on Oct. 1, 2013.

(51) Int. Cl.
*B60Q 1/14* (2006.01)
*B60Q 1/02* (2006.01)

(52) U.S. Cl.
CPC .......... *B60Q 1/143* (2013.01); *B60Q 2300/052* (2013.01); *B60Q 2300/334* (2013.01); *B60Q 2300/42* (2013.01)

(58) Field of Classification Search
None
See application file for complete search history.

(56) References Cited

U.S. PATENT DOCUMENTS

| | | | |
|---|---|---|---|
| 2,131,888 A | 10/1938 | Harris | |
| 2,632,040 A | 3/1953 | Rabinow | |
| 2,827,594 A | 3/1958 | Rabinow | |
| 3,179,845 A | 4/1965 | Kulwiec | |
| 3,581,276 A | 5/1971 | Newman | |
| 3,663,819 A | 5/1972 | Hicks et al. | |

(Continued)

FOREIGN PATENT DOCUMENTS

| | | |
|---|---|---|
| DE | 2946561 | 5/1981 |
| EP | 1504957 A2 | 9/2005 |

(Continued)

OTHER PUBLICATIONS

Christopher M. Kormanyos, "SAE Paper No. 980003 entitled "HID System with Adaptive Vertical AIM Control"," p. 13-18.

(Continued)

*Primary Examiner* — Jany Richardson
(74) *Attorney, Agent, or Firm* — Price Heneveld LLP; Scott P. Ryan

(57) ABSTRACT

An exterior light control system is provided for controlling exterior lights of a vehicle. The system includes an imaging system configured to image a forward external scene and to generate image data corresponding to the acquired images; and a controller configured to receive and analyze the image data and for generating an exterior light control signal that is used to control the exterior lights in response to analysis of the image data and in response to a selected mode of operation. When in the motorway mode, if the controller detects headlamps of one or more oncoming vehicle, the controller generates an exterior light control signal for reducing the brightness of the exterior lights, determines a relative location within the acquired images of a headlamp closest to a central feature of the acquired images, and selects a delay that varies dynamically in response to the relative location of the headlamp.

19 Claims, 4 Drawing Sheets

(56) References Cited

U.S. PATENT DOCUMENTS

| | | |
|---|---|---|
| 4,139,801 A | 2/1979 | Linares |
| 4,151,526 A | 4/1979 | Hinachi et al. |
| 4,236,099 A | 11/1980 | Rosenblum |
| 4,258,979 A | 3/1981 | Mahin |
| 4,286,308 A | 8/1981 | Wolff |
| 4,357,558 A | 11/1982 | Massoni et al. |
| 4,376,909 A | 3/1983 | Tagami et al. |
| 4,479,173 A | 10/1984 | Rumpakis |
| 4,599,544 A | 7/1986 | Martin |
| 4,645,975 A | 2/1987 | Meitzler et al. |
| 4,665,321 A | 5/1987 | Chang et al. |
| 4,692,798 A | 9/1987 | Seko et al. |
| 4,716,298 A | 12/1987 | Etoh |
| 4,727,290 A | 2/1988 | Smith et al. |
| 4,768,135 A | 8/1988 | Kretschmer et al. |
| 4,862,037 A | 8/1989 | Farber et al. |
| 4,891,559 A | 1/1990 | Matsumoto et al. |
| 4,930,742 A | 6/1990 | Schofield et al. |
| 4,934,273 A | 6/1990 | Endriz |
| 4,967,319 A | 10/1990 | Seko |
| 5,008,946 A | 4/1991 | Ando |
| 5,036,437 A | 7/1991 | Macks |
| 5,072,154 A | 12/1991 | Chen |
| 5,086,253 A | 2/1992 | Lawler |
| 5,096,287 A | 3/1992 | Kakinami et al. |
| 5,124,549 A | 6/1992 | Michaels et al. |
| 5,166,681 A | 11/1992 | Bottesch et al. |
| 5,182,502 A | 1/1993 | Slotkowski et al. |
| 5,187,383 A | 2/1993 | Taccetta et al. |
| 5,235,178 A | 8/1993 | Hegyi |
| 5,329,206 A | 7/1994 | Slotkowski et al. |
| 5,347,261 A | 9/1994 | Adell |
| 5,347,459 A | 9/1994 | Greenspan et al. |
| 5,355,146 A | 10/1994 | Chiu et al. |
| 5,379,104 A | 1/1995 | Takao |
| 5,396,054 A | 3/1995 | Krichever et al. |
| 5,402,170 A | 3/1995 | Parulski et al. |
| 5,416,318 A | 5/1995 | Hegyi |
| 5,426,294 A | 6/1995 | Kobayashi et al. |
| 5,428,464 A | 6/1995 | Silverbrook |
| 5,430,450 A | 7/1995 | Holmes |
| 5,434,407 A | 7/1995 | Bauer et al. |
| 5,451,822 A | 9/1995 | Bechtel et al. |
| 5,452,004 A | 9/1995 | Roberts |
| 5,471,515 A | 11/1995 | Fossum et al. |
| 5,475,441 A | 12/1995 | Parulski et al. |
| 5,481,268 A | 1/1996 | Higgins |
| 5,483,346 A | 1/1996 | Butzer |
| 5,485,155 A | 1/1996 | Hibino |
| 5,508,592 A | 4/1996 | Lapatovich et al. |
| 5,537,003 A | 7/1996 | Bechtel et al. |
| 5,541,724 A | 7/1996 | Hoashi |
| 5,550,677 A | 8/1996 | Schofield et al. |
| 5,554,912 A | 9/1996 | Thayer et al. |
| 5,574,463 A | 11/1996 | Shirai et al. |
| 5,587,929 A | 12/1996 | League et al. |
| 5,592,146 A | 1/1997 | Kover, Jr. |
| 5,614,788 A | 3/1997 | Mullins et al. |
| 5,621,460 A | 4/1997 | Hatlestad et al. |
| 5,660,454 A | 8/1997 | Mori et al. |
| 5,666,028 A | 9/1997 | Bechtel et al. |
| 5,684,473 A | 11/1997 | Hibino et al. |
| 5,707,129 A | 1/1998 | Kobayashi |
| 5,710,565 A | 1/1998 | Shirai et al. |
| 5,714,751 A | 2/1998 | Chen |
| 5,715,093 A | 2/1998 | Shierbeek et al. |
| 5,736,816 A | 4/1998 | Strenke et al. |
| 5,751,832 A | 5/1998 | Panter et al. |
| 5,781,105 A | 7/1998 | Bitar et al. |
| 5,786,787 A | 7/1998 | Eriksson et al. |
| 5,796,094 A | 8/1998 | Schofield et al. |
| 5,798,727 A | 8/1998 | Shirai et al. |
| 5,811,888 A | 9/1998 | Hsieh |
| 5,812,321 A | 9/1998 | Schierbeek et al. |
| 5,835,613 A | 11/1998 | Breed et al. |
| 5,837,994 A | 11/1998 | Stam et al. |
| 5,841,126 A | 11/1998 | Fossum et al. |
| 5,845,000 A | 12/1998 | Breed et al. |
| 5,867,214 A | 2/1999 | Anderson et al. |
| 5,877,897 A | 3/1999 | Schofield et al. |
| 5,905,457 A | 5/1999 | Rashid |
| 5,912,534 A | 6/1999 | Benedict |
| 5,923,027 A | 7/1999 | Stam et al. |
| 5,942,853 A | 8/1999 | Piscart |
| 5,990,469 A | 11/1999 | Bechtel et al. |
| 6,008,486 A | 12/1999 | Stam et al. |
| 6,018,308 A | 1/2000 | Shirai |
| 6,049,171 A | 4/2000 | Stam et al. |
| 6,097,023 A | 8/2000 | Schofield et al. |
| 6,102,546 A | 8/2000 | Carter |
| 6,130,421 A | 10/2000 | Bechtel et al. |
| 6,130,448 A | 10/2000 | Bauer et al. |
| 6,140,933 A | 10/2000 | Bugno et al. |
| 6,144,158 A | 11/2000 | Beam |
| 6,166,698 A | 12/2000 | Turnbull et al. |
| 6,184,781 B1 | 2/2001 | Ramakesavan |
| 6,255,639 B1 | 7/2001 | Stam et al. |
| 6,281,632 B1 | 8/2001 | Stam et al. |
| 6,329,925 B1 | 12/2001 | Skiver et al. |
| 6,349,782 B1 | 2/2002 | Sekiya et al. |
| 6,356,376 B1 | 3/2002 | Tonar et al. |
| 6,379,013 B1 | 4/2002 | Bechtel et al. |
| 6,396,040 B1 | 5/2002 | Hill |
| 6,396,397 B1 | 5/2002 | Bos et al. |
| 6,403,942 B1 | 6/2002 | Stam |
| 6,429,594 B1 | 8/2002 | Stam et al. |
| 6,442,465 B2 | 8/2002 | Breed et al. |
| 6,443,602 B1 | 9/2002 | Tanabe et al. |
| 6,465,962 B1 | 10/2002 | Fu et al. |
| 6,469,739 B1 | 10/2002 | Bechtel et al. |
| 6,483,438 B2 | 11/2002 | DeLine et al. |
| 6,491,416 B1 | 12/2002 | Strazzanti |
| 6,507,779 B2 | 1/2003 | Breed et al. |
| 6,550,943 B2 | 4/2003 | Strazzanti |
| 6,553,130 B1 | 4/2003 | Lemelson et al. |
| 6,558,026 B2 | 5/2003 | Strazzanti |
| 6,559,435 B2 | 5/2003 | Schofield et al. |
| 6,587,573 B1 | 7/2003 | Stam et al. |
| 6,593,698 B2 | 7/2003 | Stam et al. |
| 6,611,610 B1 | 8/2003 | Stam et al. |
| 6,617,564 B2 | 9/2003 | Ockerse et al. |
| 6,631,316 B2 | 10/2003 | Stam et al. |
| 6,677,986 B1 | 1/2004 | Pöchmüller |
| 6,728,393 B2 | 4/2004 | Stam et al. |
| 6,772,057 B2 | 8/2004 | Breed et al. |
| 6,774,988 B2 | 8/2004 | Stam et al. |
| 6,824,281 B2 | 11/2004 | Schofield et al. |
| 6,861,809 B2 | 3/2005 | Stam |
| 6,902,307 B2 | 6/2005 | Strazzanti |
| 6,913,375 B2 | 7/2005 | Strazzanti |
| 6,928,180 B2 | 8/2005 | Stam et al. |
| 6,946,978 B2 | 9/2005 | Schofield |
| 6,999,004 B2 | 2/2006 | Comaniciu et al. |
| 7,012,543 B2 | 3/2006 | DeLine et al. |
| 7,038,577 B2 | 5/2006 | Pawlicki et al. |
| 7,049,945 B2 | 5/2006 | Breed et al. |
| 7,255,465 B2 | 8/2007 | Deline et al. |
| 7,262,406 B2 | 8/2007 | Heslin et al. |
| 7,265,342 B2 | 9/2007 | Heslin et al. |
| 7,311,428 B2 | 12/2007 | Deline et al. |
| 7,321,112 B2 | 1/2008 | Stam et al. |
| 7,417,221 B2 | 8/2008 | Creswick et al. |
| 7,446,650 B2 | 11/2008 | Schofield et al. |
| 7,467,883 B2 | 12/2008 | Deline et al. |
| 7,468,651 B2 | 12/2008 | Deline et al. |
| 7,526,103 B2 | 4/2009 | Schofield et al. |
| 7,533,998 B2 | 5/2009 | Schofield et al. |
| 7,565,006 B2 | 7/2009 | Stam et al. |
| 7,567,291 B2 | 7/2009 | Bechtel et al. |
| 7,575,348 B2 | 8/2009 | Hasegawa |
| 7,653,215 B2 | 1/2010 | Stam |
| 7,658,521 B2 | 2/2010 | Deline et al. |
| 7,683,326 B2 | 3/2010 | Stam et al. |
| 7,708,434 B2 | 5/2010 | Moizard et al. |

(56) References Cited

U.S. PATENT DOCUMENTS

| | | |
|---|---|---|
| 7,719,408 B2 | 5/2010 | Deward et al. |
| 7,720,580 B2 | 5/2010 | Higgins-Luthman |
| 7,815,326 B2 | 10/2010 | Blank et al. |
| 7,877,175 B2 | 1/2011 | Higgins-Luthman |
| 7,881,839 B2 | 2/2011 | Stam et al. |
| 7,888,629 B2 | 2/2011 | Heslin et al. |
| 7,914,188 B2 | 3/2011 | Deline et al. |
| 7,972,045 B2 | 7/2011 | Schofield |
| 7,994,471 B2 | 8/2011 | Heslin et al. |
| 8,045,760 B2 | 10/2011 | Stam et al. |
| 8,063,753 B2 | 11/2011 | Deline et al. |
| 8,090,153 B2 | 1/2012 | Schofield et al. |
| 8,100,568 B2 | 1/2012 | Deline et al. |
| 8,116,929 B2 | 2/2012 | Higgins-Luthman |
| 8,120,652 B2 | 2/2012 | Bechtel et al. |
| 8,142,059 B2 | 3/2012 | Higgins-Luthman et al. |
| 8,162,518 B2 | 4/2012 | Schofield |
| 8,203,443 B2 | 6/2012 | Bos et al. |
| 8,217,830 B2 | 7/2012 | Lynam |
| 8,222,588 B2 | 7/2012 | Schofield et al. |
| 8,258,433 B2 | 9/2012 | Byers et al. |
| 8,289,142 B2 | 10/2012 | Pawlicki et al. |
| 8,289,430 B2 | 10/2012 | Bechtel et al. |
| 8,325,028 B2 | 12/2012 | Schofield et al. |
| 8,543,254 B1 | 9/2013 | Schut et al. |
| 8,718,899 B2 | 5/2014 | Schwindt et al. |
| 2002/0040962 A1 | 4/2002 | Schofield et al. |
| 2003/0202357 A1 | 10/2003 | Strazzanti |
| 2004/0143380 A1* | 7/2004 | Stam et al. .................. 701/36 |
| 2004/0145905 A1 | 7/2004 | Strazzanti |
| 2008/0044062 A1 | 2/2008 | Stam et al. |
| 2008/0294315 A1 | 11/2008 | Breed |
| 2012/0072080 A1 | 3/2012 | Jeromin et al. |
| 2012/0271511 A1* | 10/2012 | Dierks et al. ................. 701/36 |
| 2013/0028473 A1 | 1/2013 | Hilldore et al. |
| 2013/0320193 A1* | 12/2013 | Liken et al. ............... 250/208.1 |
| 2014/0036080 A1 | 2/2014 | Schut et al. |
| 2014/0247351 A1 | 9/2014 | Murillo Amaya etal |

FOREIGN PATENT DOCUMENTS

| | | |
|---|---|---|
| FR | 2641237 | 7/1990 |
| FR | 2726144 | 4/1996 |
| GB | 2313973 | 12/1997 |
| JP | 5744541 | 3/1982 |
| JP | 6015237 | 1/1985 |
| JP | 62131837 | 6/1987 |
| JP | 01233129 | 9/1989 |
| JP | 5139203 | 6/1993 |
| JP | 5342901 | 12/1993 |
| JP | 06151067 | 5/1994 |
| JP | 06267304 | 9/1994 |
| JP | 6276524 | 9/1994 |
| JP | 6295601 | 10/1994 |
| JP | 6321007 | 11/1994 |
| JP | 732936 | 2/1995 |
| JP | 747878 | 2/1995 |
| JP | 7052706 | 2/1995 |
| JP | 769125 | 3/1995 |
| JP | 8166221 | 6/1996 |
| JP | 08221700 | 8/1996 |
| WO | 8605147 | 9/1986 |
| WO | 9735743 | 10/1997 |
| WO | 9843850 | 10/1998 |
| WO | 9947396 | 10/1999 |
| WO | 0022881 | 4/2000 |

OTHER PUBLICATIONS

J.P. Lowenau et al, "SAE Paper No. 980007 entitled "Adaptive Light Control—A New Light Concept Controlled by Vehicle Dynamics and Navigation"," p. 33-38.

Franz-Josef Kalze, "SAE Paper No. 980005 entitled "Xenon Light for Main and Dipped Beam"," p. 23-26.

Tohru Shimizu et al, (SAE Paper No. 980322 entitled "Development of PWM DRL with Low RF Emissions and Low Heat", p. 113-117.

International Searching Authority, Patent Cooperation Treaty, International Search Report and Written Opinion, Sep. 12, 2013, 6 pages.

International Searching Authority, Patent Cooperation Treaty, International Search Report and Written Opinion, Dec. 25, 2014, 6 pages.

JP Abstract of Patent No. 60-015237, "Headlight Device," (Jan. 25, 1985).

JP Abstract of Patent No. 01233129 A, "Optical Axis Changing Device for Illuminating Lamp," (Sep. 18, 1989).

JP Abstract of Patent No. 5342901, "Projection headlamp for vehicles," p. 1.

JP Abstract for Patent No. 6321007, "Vehicular Dazzle Sensor," p. 1.

JP Abstract of Patent No. 08221700 A, "Stop Lamp Recognition Device," p. 1.

* cited by examiner

SYSTEM AND METHOD FOR CONTROLLING EXTERIOR VEHICLE LIGHTS ON MOTORWAYS

CROSS-REFERENCE TO RELATED APPLICATION

This application claims priority to and the benefit under 35 U.S.C. §119(e) of U.S. Provisional Patent Application No. 61/885,126, filed on Oct. 1, 2013, entitled "SYSTEM AND METHOD FOR CONTROLLING EXTERIOR VEHICLE LIGHTS ON MOTORWAYS," the entire disclosure of which is hereby incorporated herein by reference.

FIELD OF THE INVENTION

The present invention generally relates to a system and method for controlling exterior lights of a controlled vehicle, and more specifically relates to improvements in systems that control exterior lights of a controlled vehicle in response to the detection of other vehicles, particularly on motorways.

SUMMARY OF THE INVENTION

According to one aspect of the present invention, an exterior light control system is provided for controlling exterior lights of a controlled vehicle. The exterior light control system comprises: an imaging system configured to image a scene external and forward of the controlled vehicle and to generate image data corresponding to the acquired images; and a controller configured to receive and analyze the image data and for generating an exterior light control signal that is used to control the exterior lights in response to analysis of the image data and in response to a selected mode of operation. If the controller detects headlamps of one or more oncoming vehicle, the controller is configured to generate an exterior light control signal for reducing the brightness of the exterior lights, to determine a relative location within the acquired images of a headlamp closest to a central feature of the acquired images, and to select a delay that varies dynamically in response to the relative location of the headlamp. Upon determining that oncoming headlamps are no longer present in the acquired images that require the exterior lights to remain in a reduced brightness state, the controller is configured to nevertheless continue to analyze acquired images for the selected delay before generating an exterior light control signal for increasing the brightness of the exterior lights.

According to another aspect of the present invention, an exterior light control system is provided for controlling exterior lights of a controlled vehicle. The exterior light control system comprises: an imaging system configured to image a scene external and forward of the controlled vehicle and to generate image data corresponding to the acquired images; and a controller configured to receive and analyze the image data and for generating an exterior light control signal that is used to control the exterior lights in response to analysis of the image data and in response to a selected mode of operation. One selected mode of operation is a motorway mode that is selected when the controller determines that the controlled vehicle is traveling on a motorway. When not in the motorway mode, the controller is configured to detect whether light sources are AC light sources using a first sensitivity. When in the motorway mode, the controller is configured to detect whether light sources appearing on a left side of the acquired images and below a specified height are AC light sources using a second sensitivity that is lower than the first sensitivity while detecting whether light sources appearing in the remaining portions of the acquired images are AC light sources using the first sensitivity. When in the motorway mode, if the controller detects headlamps of one or more oncoming vehicle, the controller is configured to generate an exterior light control signal for reducing the brightness of the exterior lights.

According to another aspect of the present invention, a non-transitory computer readable medium is provided having stored thereon software instructions that, when executed by a processor, cause the processor to generate control signals for controlling exterior lights of a controlled vehicle by executing the steps comprising: imaging a scene external and forward of the controlled vehicle and generating image data corresponding to the acquired images; receiving and analyzing the image data in the processor; generating a control signal from the processor that is used to control the exterior lights in response to analysis of the image data and in response to a selected mode of operation; and if the processor detects headlamps of one or more oncoming vehicle, the processor is configured to generate an exterior light control signal for reducing the brightness of the exterior lights, to determine a relative location within the acquired images of a headlamp closest to a central feature of the acquired images, and to select a delay that varies dynamically in response to the relative location of the headlamp, and wherein, upon determining that oncoming headlamps are no longer present in the acquired images that require the exterior lights to remain in a reduced brightness state, the processor is configured to nevertheless continue to analyze acquired images for the selected delay before generating an exterior light control signal for increasing the brightness of the exterior lights.

These and other features, advantages, and objects of the present invention will be further understood and appreciated by those skilled in the art by reference to the following specification, claims, and appended drawings.

BRIEF DESCRIPTION OF THE DRAWINGS

The present invention will be more fully understood from the detailed description and the accompanying drawings, wherein.

DETAILED DESCRIPTION OF THE PREFERRED EMBODIMENTS

Figure 1:
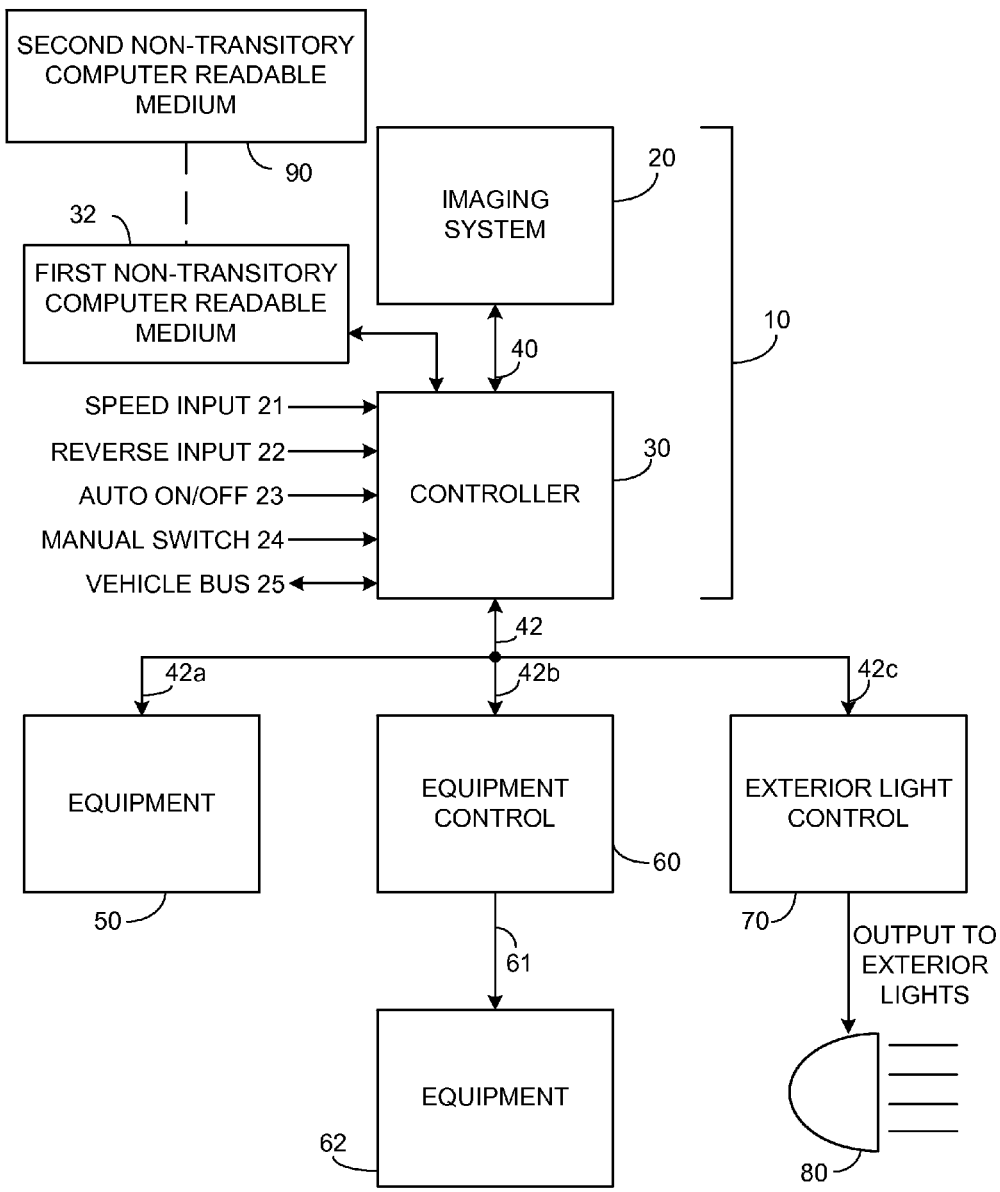
FIG. 1 is a block diagram of a system constructed according to one embodiment.

Reference will now be made in detail to the present preferred embodiments, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

The embodiments described herein relate to an exterior light control system for controlling exterior lights of a controlled vehicle in response to image data acquired from an image sensor, which captures images forward of the vehicle.

Prior systems are known for controlling exterior vehicle lights in response to images captured forward of the vehicle. In these prior systems, a controller would analyze the captured images and determine if any preceding or oncoming vehicles were present in a glare area in front of the vehicle employing the system. This "glare area" was the area in which the exterior lights would cause excessive glare to a driver if the exterior lights were in a high-beam state (or some state other than a low-beam state). If a vehicle was present in the glare area, the controller would respond by changing the state of the exterior lights so as to not cause glare for the other driver(s). Examples of such systems are described in U.S. Pat. Nos. 5,837,994; 5,990,469; 6,008,486; 6,049,171; 6,130,421; 6,130,448; 6,166,698; 6,379,013; 6,403,942; 6,587,573; 6,611,610; 6,631,316; 6,774,988; 6,861,809; 7,321,112; 7,417,221; 7,565,006; 7,567,291; 7,653,215; 7,683,326; 7,881,839; 8,045,760; 8,120,652; and 8,543,254, the entire disclosures of which are incorporated herein by reference.

U.S. Pat. No. 8,543,254 discloses an exterior light control system that improves upon the prior systems by determining a road model based on the roadway width and roadway type (i.e., motorway, two-lane road, multi-lane road, etc.) in order to more accurately discriminate between other vehicles and non-vehicle light sources, reflectors, and road signs and to allow different modes of operation depending upon the type of roadway on which the controlled vehicle is traveling. More specifically, the roadway width may be estimated from various objects detected in the forward scene, including lane markers, reflectors, road signs, and any other objects that may be useful to detect the edges of the road. The roadway type may be determined from the roadway width. Other vehicle parameters such as vehicle speed, yaw, roll, steering wheel position and vehicle direction may also be used when determining the roadway type and the road model. Then, using the road model, the system may track the positioning (or "world positioning") relative to the controlled vehicle, the movement, the brightness, the size, the color, and other characteristics of various detected light sources to determine if the light sources appear to be on the roadway. If so, the light sources are more likely to be another vehicle to which the system responds by appropriately controlling the exterior lights.

One of the modes in which the exterior lighting control systems may operate is a motorway mode. The motorway mode is selected when the system determines that the controlled vehicle is traveling on a motorway (i.e., an expressway or divided highway). In the motorway mode, the system may not be responsive to oncoming vehicles because the presence of a guard rail or other barrier in the median blocks the headlamps of oncoming vehicles making them hard to detect. However, such barriers also block light from the controlled vehicle that would otherwise cause glare to drivers of oncoming vehicles. Examples of exterior light control systems that detect motorways and operate in a motorway mode are disclosed in U.S. Pat. Nos. 6,861,809 and 8,045,760, the entire disclosures of which are incorporated herein by reference.

A problem has been found to exist in that there are intermittent obstacles in the median of a motorway. If, for example, a controlled vehicle detects an oncoming vehicle on a motorway and dims its headlights, obstacles in the median may thereafter make it appear as if the oncoming vehicle is no longer present, in which case the controlled vehicle returns its headlights to the brightest level. However, as those intermittent median obstacles pass, bright light from the controlled vehicle's headlamps can cause excessive glare for the oncoming vehicle. Further, the intermittent median obstacles can cause the controlled vehicle's headlights to frequently change states thereby distracting the driver of the controlled vehicle and thereby becoming a nuisance to the driver.

Accordingly, the exterior light control system described herein is capable of dynamically delaying a return to bright light states of the controlled vehicle's headlights while operating on a motorway. As explained below, the delay may be dynamically varied in response to a determination of where, within the acquired images, the rightmost (or closest to the median of the motorway or central feature of the acquired images) headlamp of an oncoming vehicle is located. In countries where vehicles are driven on the right-hand side of the motorway, the median is on the left-hand side. In such countries, vehicles whose headlamps appear near the central feature of a captured image are generally farther away than those vehicles whose headlamps appear nearer to the left-hand side of the image. Because vehicles that are farther away take longer to pass, the delay is greater when the rightmost headlamp is detected closer to the central feature of the image and is lesser when the rightmost headlamp is detected closer to the left-hand side.

Conversely, in countries where vehicles are driven on the left-hand side of the motorway, the median is on the right-hand side. In such countries, vehicles whose headlamps appear near the central feature of a captured image are generally farther away than those vehicles whose headlamps appear nearer to the right-hand side of the image. Because vehicles that are farther away take longer to pass, the delay is greater when the leftmost headlamp is detected closer to the central feature of the image and is lesser when the leftmost headlamp is detected closer to the right-hand side.

As used herein, "a central feature" of the acquired images may be the actual physical center of the image or may be a center of optical flow of the acquired images. Detecting the center of optical flow of acquired images may be performed in the manner disclosed in commonly assigned U.S. Pat. No. 8,004,425; United States Publication No. US 2014/0247351 A1; and U.S. application Ser. No. 14/462,888, entitled "IMAGING SYSTEM AND METHOD WITH EGO MOTION DETECTION," filed on Aug. 19, 2014, by David J. Wright et al., the entire disclosures of which are incorporated herein by reference. Using the center of optical flow is a more robust method than just using the physical center of the image because it accounts for aim tolerances as well as the changing forward scene.

The exterior light control system 10 (FIG. 1) thus may include an imaging system 20 configured to image a scene external and forward of the controlled vehicle and to generate image data corresponding to the acquired images, and a controller 30 configured to receive and analyze the image data and for generating an exterior light control signal that is used to control the exterior lights 80 in response to analysis of the image data and in response to a selected mode of operation. One selected mode of operation is a motorway mode that is selected when the controller determines that the controlled vehicle is traveling on a motorway. When in the motorway mode, if the controller detects headlamps of one or more oncoming vehicle, the controller generates an exterior light control signal for reducing the brightness of the exterior lights, determines a relative location within the acquired images of a headlamp closest to a central feature of the acquired images and selects a delay that varies dynamically in response to the relative location of the headlamp. Upon determining that oncoming headlamps are no longer present in the acquired images that require the exterior lights to remain in a reduced brightness state, the controller nevertheless continues to analyze acquired images for the selected delay before generating an exterior light control signal for increasing the brightness of the exterior lights. If headlamps are detected during the delay, the controller will continue to analyze the subsequently acquired images until such time that oncoming headlamps are no longer present in the acquired images for a time period corresponding to the selected delay before generating an exterior light control signal for increasing the brightness of the exterior lights. The closer the headlamp is to a central feature of the acquired images, the longer the selected delay.

The controller may utilize a static delay of, for example, 3 seconds when not in a motorway mode. When on a motorway, instead of setting the static delay, the dynamic delay may be set based on the relative location of the rightmost (or closest to the central feature of the image) headlamp within the acquired images. The dynamic delay may be selected or computed using various methods such as using a look-up table or an equation. An example of an equation-based approached is illustrated below for purposes of example. Specifically, the delay, dynamic_delay, may be determined as follows:

$$\text{dynamic\_delay} = (x\_pos*((\text{max\_delay}-hl\_\text{delay})/(x\_\text{max}-x\_\text{min})))+\text{max\_delay}$$

Figure 3:
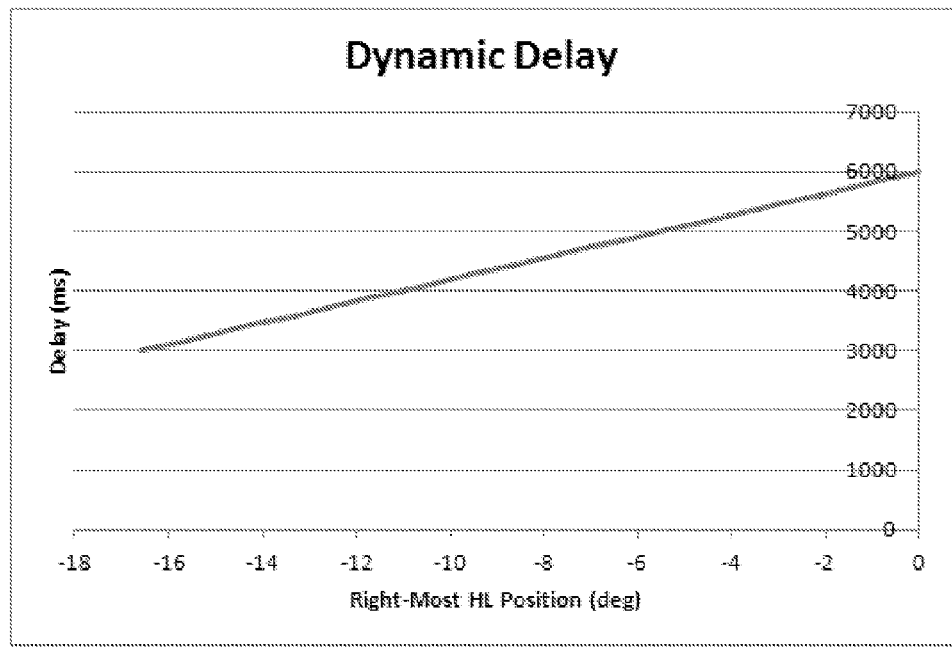
FIG. 3 is plot of the dynamic delay as a function of the relative position of the rightmost oncoming headlamp detected in an acquired image.

In the equation above, x_pos is the detected position of the rightmost oncoming headlamp within the acquired image; hl_delay is the minimum configurable headlamp hold delay; max_delay is the maximum configurable headlamp hold delay, which may be equal to 2*hl_delay; x_max is the maximum possible position of the rightmost oncoming headlamp relative to the central feature of the image; and x_min is the minimum possible position of the rightmost oncoming headlamp relative to the left-hand side of the image. To further illustrate this example, a plot is shown in FIG. 3 of the dynamic delay (dynamic_delay) (in milliseconds) as a function of the position (x_pos) of the rightmost oncoming headlamp within the acquired image (in degrees). In this example, hl_delay=3 seconds, max_delay=6 seconds, x_max=0 degrees, x_min=−16.6 degrees. Although this example produces a linear relationship between headlamp position and delay, the system may be configured to have a non-linear or exponential relationship. In these examples, the coordinate system is based on the origin located at the center of optical flow of the acquired image. Positive axes are right of center (+x) and above center (+y).

The controller may determine that the controlled vehicle is traveling on a motorway when the controlled vehicle is traveling at a speed above a motorway speed threshold. Alternatively, the controller may access GPS navigational data or may use a road model determined using the imaging system. Such road models may be determined by analyzing the relative world positions of prior oncoming traffic as detected by the system. Road models may also be determined using the controlled vehicle's navigational system. A system for determining a road model is disclosed in U.S. Pat. No. 8,543,254, the entire disclosure of which is incorporated herein by reference.

Current exterior light control systems can distinguish street lights and house lights from lights of other vehicles by detecting an AC modulation within the light sources. Ideally, such systems do not respond to a street light or house light in the same manner as they would an oncoming vehicle. Another problem that sometimes arises when traveling on a motorway is that the intermittent obstructions in the median of the motorway can cause oncoming headlamps to appear as though they are flickering, which can be mistaken for an AC powered street light. Given that AC powered light sources are not typically nearby a motorway unless driving through a highly populated area, it is safe to reduce the sensitivity of AC light source detection when the system is in a motorway mode. Because oncoming headlamps on a motorway are typically detected on the median side of the motorway (left side of the image for countries in which vehicles drive on the right-hand side of the road and right side of the image for countries in which vehicles drive on the left-hand side of the road), controller 30 may only reduce the sensitivity of AC light source detection in a side portion of the acquired image closest to the median. Further, since street lights typically appear in the upper portion of the images, while headlamps in the mid to lower portions, AC detection sensitivity may be maintained across the upper portion of the images. Thus, when not in the motorway mode, the controller detects whether light sources are AC light sources using a first sensitivity. However, when in the motorway mode, the controller detects whether light sources appearing on a left side of the acquired images and below a specified height are AC light sources using a second sensitivity that is lower than the first sensitivity while detecting whether light sources appearing in the remaining portions of the acquired images are AC light sources using the first sensitivity. The controller detects whether light sources are AC light sources by utilizing upper and lower thresholds. The controller adjusts the sensitivity between the first and second sensitivities by changing the upper and lower thresholds by an offset value. For example, a reduction in sensitivity may be achieved by increasing the upper and lower threshold light levels by the offset value.

A first embodiment of an exterior light control system 10 is shown in FIG. 1. Exterior light control system 10 is provided for controlling exterior lights 80 and, optionally, other equipment (50, 62) of a controlled vehicle. System 10 includes an imaging system 20 and a controller 30. Imaging system 20 includes an image sensor (201, FIG. 2) that is configured to image a scene external and forward of the controlled vehicle and to generate image data corresponding to the acquired images. Controller 30 receives and analyzes the image data and generates an exterior light control signal that is used to control exterior lights 80 and may generate control signals to control any additional equipment (50, 62). These control signals are generated in response to analysis of the image data.

Controller 30 may be configured to directly connect to the equipment (50) being controlled such that the generated control signals directly control the equipment. Alternatively, controller 30 may be configured to connect to an equipment control (60 and 70), which, in turn, is connected to the equipment being controlled (62 and 80) such that the control signals generated by controller 30 only indirectly control the equipment. For example, in the case of the equipment being exterior lights 80, controller 30 may analyze the image data from imaging system 20 so as to generate control signals that are more of a recommendation for an exterior light control 70 to use when controlling exterior lights 80. The control signals may further include not just a recommendation, but also a code representing a reason for the recommendation so that equipment controls 60 and 70 may determine whether or not to override a recommendation.

As shown in FIG. 1, various inputs (such as inputs 21-24) may be provided to controller 30 that may be taken into account in forming a recommendation or direct control signal. In some cases, such inputs may instead be provided to equipment control (60 and 70). For example, input from manual switches may be provided to equipment control (60 and 70), which may allow equipment control (60 and 70) to override a recommendation from controller 30. It will be appreciated that various levels of interaction and cooperation between controller 30 and equipment controls (60 and 70) may exist. One reason for separating control functions is to allow imaging system 20 to be located in the best location in the vehicle for obtaining images, which may be a distance from the equipment to be controlled and to allow communication over the vehicle bus 25.

According to one embodiment, the equipment that system 10 controls may include one or more exterior lights 80 and the control signal generated by controller 30 may be an exterior light control signal. In this embodiment, exterior lights 80 may be controlled directly by controller 30 or by an exterior light control 70, which receives a control signal from controller 30. As used herein, the "exterior lights" broadly include any exterior lighting on the vehicle. Such exterior lights may include headlamps (both low and high beam if separate from one another), tail lights, foul weather lights such as fog lights, brake lights, center-mounted stop lights (CHMSLs), turn signals, back-up lights, etc. The exterior lights may be operated in several different modes including conventional low-beam and high-beam states. They may also be operated as daytime running lights, and additionally as super-bright high beams and/or LASER high beams in those countries where they are permitted.

The brightness of the exterior lights may also be continuously varied between the low, high, and super-high states. Separate lights may be provided for obtaining each of these exterior lighting states or the actual brightness of the exterior lights may be varied to provide these different exterior lighting states. In either case, the "perceived brightness" or illumination pattern of the exterior lights is varied. As used herein, the term "perceived brightness" means the brightness of the exterior lights as perceived by an observer outside the vehicle. Most typically, such observers will be drivers or passengers in a preceding vehicle or in a vehicle traveling along the same street in the opposite direction. Ideally, the exterior lights are controlled such that if an observer is located in a vehicle within a "glare area" relative to the vehicle (i.e., the area in which the observer would perceive the brightness of the exterior lights as causing excessive glare), the beam illumination pattern is varied such that the observer is no longer in the glare area. The perceived brightness and/or glare area of the exterior lights may be varied by changing the illumination output of one or more exterior lights, by steering one or more lights to change the aim of one or more of the exterior lights, selectively blocking or otherwise activating or deactivating some or all of the exterior lights, altering the illumination pattern forward of the vehicle, or a combination of the above.

Imaging system 20 may be any conventional system. Examples of suitable imaging systems are disclosed in published United States Publication Nos. US 20080192132 A1 and US 20120072080 A1, and in U.S. Provisional Application Nos. 61/500,418 entitled "MEDIAN FILTER" filed on Jun. 23, 2011, by Jon H. Bechtel et al.; 61/544,315 entitled "MEDIAN FILTER" and filed on Oct. 7, 2011, by Jon H. Bechtel et al.; and 61/556,864 entitled "HIGH DYNAMIC RANGE CAMERA LOW LIGHT LEVEL FILTERING" filed on Nov. 8, 2011, by Jon H. Bechtel et al., the entire disclosures of which are incorporated herein by reference.

The imaging system includes an image sensor (or camera) to capture images that may then be displayed and/or analyzed in order to control vehicle equipment in addition to exterior lights. For example, such imagers have been used for lane departure warning systems, forward collision warning systems, adaptive cruise control systems, pedestrian detection systems, night vision systems, terrain detection systems, parking assist systems, traffic sign recognition systems, and reverse camera display systems. Examples of systems using imagers for such purposes are disclosed in U.S. Pat. Nos. 5,837,994; 5,990,469; 6,008,486; 6,049,171; 6,130,421; 6,130,448; 6,166,698; 6,379,013; 6,403,942; 6,587,573; 6,611,610; 6,631,316; 6,774,988; 6,861,809; 7,321,112; 7,417,221; 7,565,006; 7,567,291; 7,653,215; 7,683,326; 7,881,839; 8,045,760; and 8,120,652, and in U.S. Provisional Application Nos. 61/512,213 entitled "RAISED LANE MARKER DETECTION SYSTEM AND METHOD THEREOF" and filed on Jul. 27, 2011, by Brock R. Rycenga et al., and 61/512,158 entitled "COLLISION WARNING SYSTEM AND METHOD THEREOF" and filed on Jul. 27, 2011, by Brock R. Rycenga et al., which together correspond to published United States Publication No. US 2013/0028473 A1, the entire disclosures of which are incorporated herein by reference.

In the example shown in FIG. 1, imaging system 20 may be controlled by controller 30. Communication of imaging system parameters as well as image data occurs over communication bus 40, which may be a bi-directional serial bus, parallel bus, a combination of both, or other suitable means. Controller 30 serves to perform equipment control functions by analyzing images from imaging system 20, determining an equipment (or exterior light) state based upon information detected within those images, and communicating the determined equipment (or exterior light) state to the equipment 50, equipment control 60, or exterior light control 70 through bus 42, which may be the vehicle bus 25, a CAN bus, a LIN bus or any other suitable communication link. Controller 30 may control the imaging system to be activated in several different modes with different exposure times and different readout windows. Controller 30 may be used to both perform the equipment or exterior light control function and control the parameters of imaging system 20.

Controller 30 can also take advantage of the availability of signals (such as vehicle speed and yaw) communicated via discrete connections or over the vehicle bus 25 in making decisions regarding the operation of the exterior lights 80. In particular, speed input 21 provides vehicle speed information to the controller 30 from which speed can be a factor in determining the control state for the exterior lights 80 or other equipment. The reverse signal 22 informs controller 30 that the vehicle is in reverse, responsive to which the controller 30 may clear an electrochromic mirror element regardless of signals output from light sensors. Auto ON/OFF switch input 23 is connected to a switch having two states to dictate to controller 30 whether the vehicle exterior lights 80 should be automatically or manually controlled. The auto ON/OFF switch (not shown) connected to the ON/OFF switch input 23 may be incorporated with the headlamp switches that are traditionally mounted on the vehicle dashboard or incorporated into steering wheel column levels. Manual dimmer switch input 24 is connected to a manually actuated switch (not shown) to provide a manual override signal for an exterior light control state. Some or all of the inputs 21, 22, 23, 24 and outputs 42a, 42b, and 42c, as well as any other possible inputs or outputs, such as a steering wheel input, can optionally be provided through vehicle bus 25 shown in FIG. 1. Alternatively, these inputs 21-24 may be provided to equipment control 60 or exterior light control 70.

Controller 30 can control, at least in part, other equipment 50 within the vehicle which is connected to controller 30 via vehicle bus 42. Specifically, the following are some examples of one or more equipment 50 that may be controlled by controller 30: exterior lights 80, a rain sensor, a compass, information displays, windshield wipers, a heater, a defroster, a defogger, an air conditioning system, a telephone system, a navigation system, a security system, a tire pressure monitoring system, a garage door opening transmitter, a remote keyless entry system, a telematics system, a voice recognition system such as a digital signal processor-based voice actuation system, a vehicle speed control, interior lights, rearview mirrors, an audio system, an engine control system, and various other switches and other display devices that may be located throughout the vehicle.

In addition, controller 30 may be, at least in part, located within a rearview assembly of a vehicle or located elsewhere within the vehicle. The controller 30 may also use an additional controller (or controllers), such as equipment control 60, which may be located in a rearview assembly or elsewhere in the vehicle in order to control certain kinds of equipment 62. Equipment control 60 can be connected to receive via vehicle bus 42 control signals generated by controller 30. Equipment control 60 subsequently communicates and controls equipment 62 via bus 61. For example, equipment control 60 may be a windshield wiper control unit which controls windshield wiper equipment, turning this equipment ON or OFF. Equipment control 60 may also be an electrochromic mirror control unit where controller 30 is programmed to communicate with the electrochromic control unit in order for the electrochromic control unit to change the reflectivity of the electrochromic mirror(s) in response to information obtained from an ambient light sensor, a glare sensor, as well as any other components coupled to the processor. Specifically, equipment control unit 60 in communication with controller 30 may control the following equipment: exterior lights, a rain sensor, a compass, information displays, windshield wipers, a heater, a defroster, a defogger, air conditioning, a telephone system, a navigation system, a security system, a tire pressure monitoring system, a garage door opening transmitter, a remote keyless entry, a telemetry system, a voice recognition system such as a digital signal processor-based voice actuation system, a vehicle speed, interior lights, rearview mirrors, an audio system, a climate control, an engine control, and various other switches and other display devices that may be located throughout the vehicle.

Figure 2:
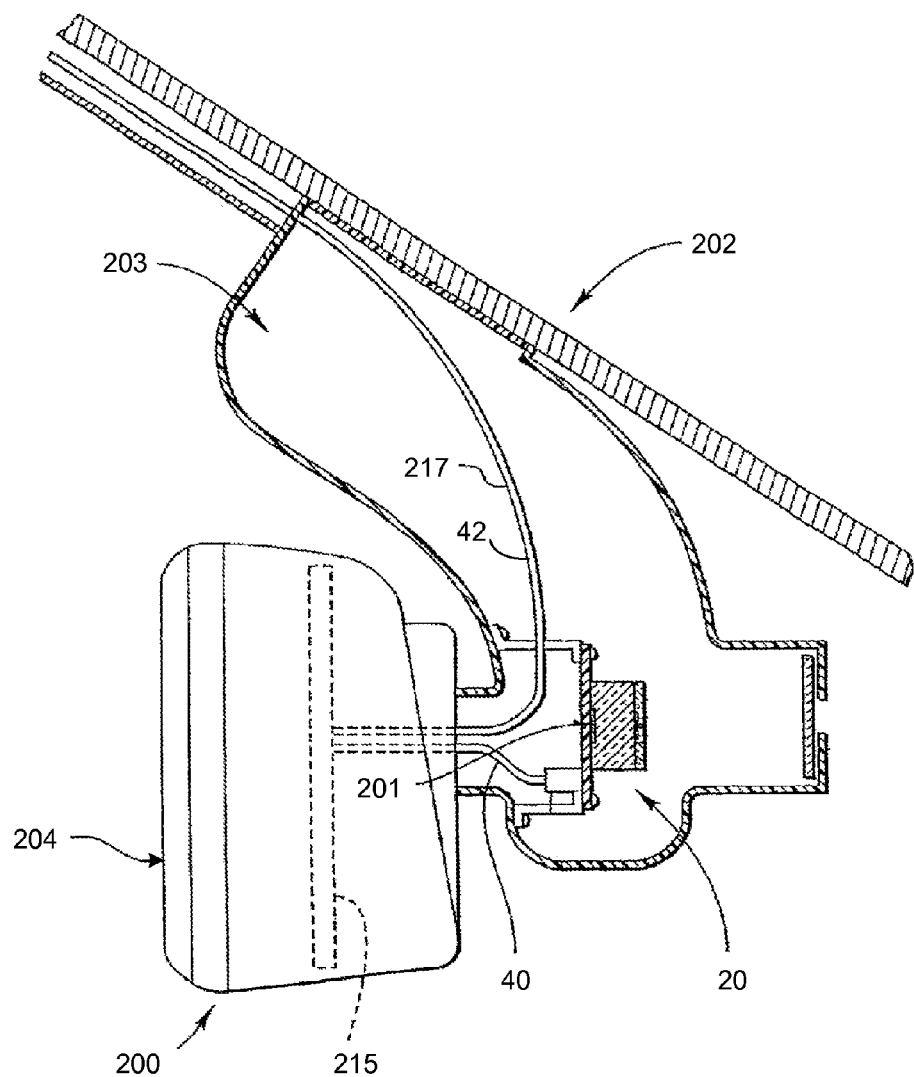
FIG. 2 is a partial cross section of a rearview assembly incorporating a system in accordance with another embodiment.

Portions of system 10 can be advantageously integrated into a rearview assembly 200 as illustrated in FIG. 2, wherein imaging system 20 is integrated into a mount 203 of rearview assembly 200. This location provides an unobstructed forward view through a region of the windshield 202 of the vehicle that is typically cleaned by the vehicle's windshield wipers (not shown). Additionally, mounting the image sensor 201 of imaging system 20 in the rearview assembly permits sharing of circuitry such as the power supply, microcontroller and light sensors.

Referring to FIG. 2, image sensor 201 is mounted within rearview mount 203, which is mounted to vehicle windshield 202. The rearview mount 203 provides an opaque enclosure for the image sensor with the exception of an aperture through which light is received from a forward external scene.

Controller 30 of FIG. 1 may be provided on a main circuit board 215 and mounted in rearview housing 204 as shown in FIG. 2. As discussed above, controller 30 may be connected to imaging system 20 by a bus 40 or other means. The main circuit board 215 may be mounted within rearview housing 204 by conventional means. Power and a communication link 42 with the vehicle electrical system, including the exterior lights 80 (FIG. 1), are provided via a vehicle wiring harness 217 (FIG. 2).

Rearview assembly 200 may include a mirror element or a display that displays a rearward view. The mirror element may be a prismatic element or an electro-optic element, such as an electrochromic element.

Additional details of the manner by which system 10 may be integrated into a rearview mirror assembly 200 are described in U.S. Pat. No. 6,611,610, the entire disclosure of which is incorporated herein by reference. Alternative rearview mirror assembly constructions used to implement exterior light control systems are disclosed in U.S. Pat. No. 6,587,573, the entire disclosure of which is incorporated herein by reference.

The above-described method may be implemented by controller 30 using image data received from imaging system 20. This method may be a subroutine executed by any processor, and thus this method may be embodied in a non-transitory computer readable medium having stored thereon software instructions that, when executed by a processor, cause the processor to control the equipment of the controlled vehicle by executing the steps of the method described below. In other words, aspects of the inventive method may be achieved by software stored on a non-transitory computer readable medium or software modifications or updates to existing software residing in a non-transitory computer readable medium. Such software or software updates may be downloaded into a first non-transitory computer readable media 32 of controller 30 (or locally associated with controller 30 or some other processor) typically prior to being installed in a vehicle, from a second non-transitory computer readable media 90 located remote from first non-transitory computer readable media 32. Second non-transitory computer readable media 90 may be in communication with first non-transitory computer readable media 32 by any suitable means, which may at least partially include the Internet or a local or wide area wired or wireless network.

Figure 4:
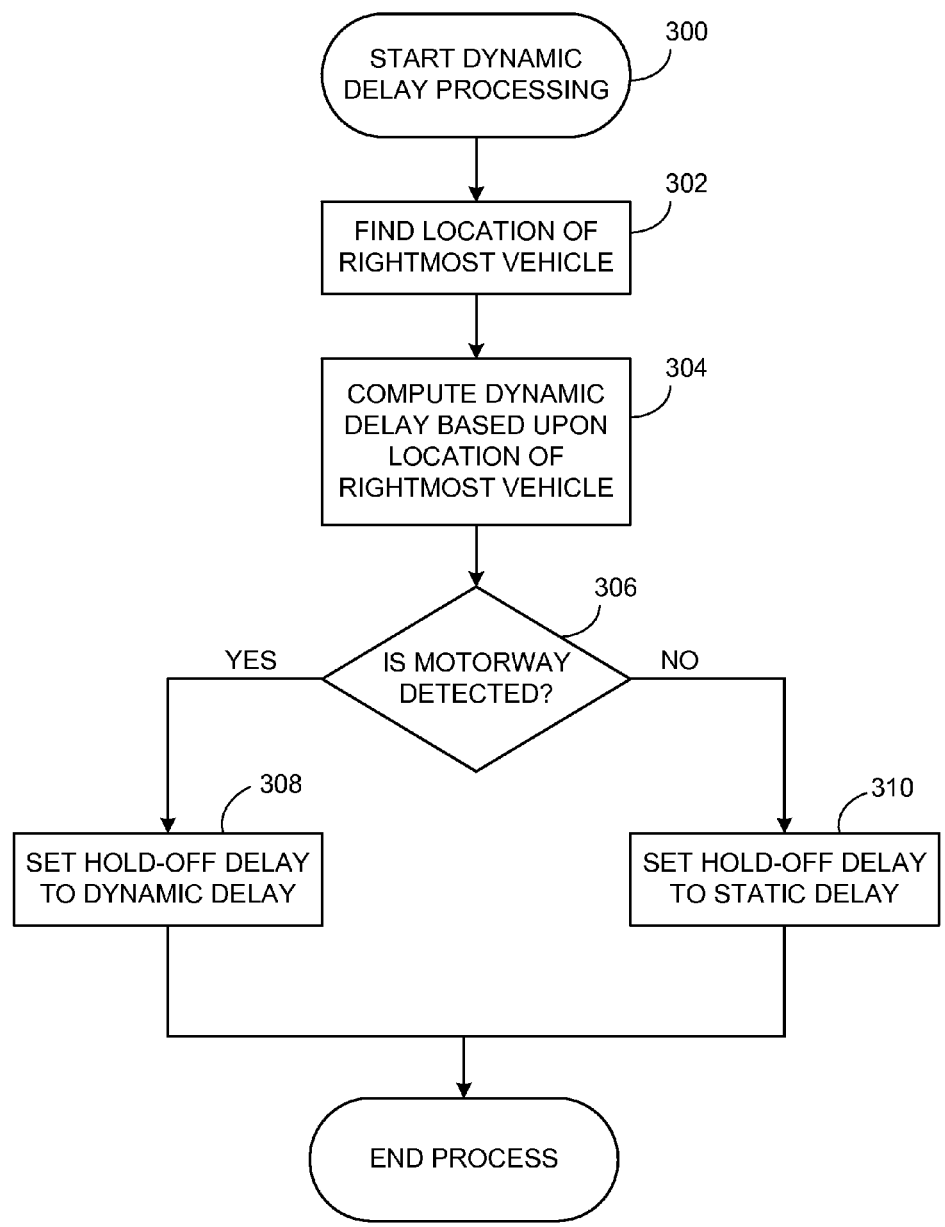
FIG. 4 is a flow chart illustrating a subroutine executed by the controller in FIG. 1.

As mentioned above, the inventive method may be a subroutine executed by controller 30 or any other processor. An example of a dynamic delay processing subroutine 300 is shown in FIG. 4. The process begins in step 302 wherein controller 30 finds the location of the rightmost vehicle (or leftmost for countries in which vehicles are driven on the left-hand side of the road). Next, controller 30 computes the dynamic delay based upon the location of the rightmost vehicle (step 304). Controller 30 then determines in step 306 whether a motorway is detected (and hence if the system is operating in a motorway mode). If a motorway is detected, controller 30 sets the hold-off delay to the computed dynamic delay in step 308 before ending the subroutine. Otherwise, if a motorway is not detected, controller 30 sets the hold-off delay to a static delay.

Although the embodiments above have described the use of a dynamic delay when in a motorway mode and a static delay when not in a motorway mode, the dynamic delay may be used in other modes or even all other modes of operation instead of using a static delay. In addition, controller 30 need not be responsible for determining whether the vehicle is traveling on a motorway as this may be determined by another controller, such as the vehicle's navigation system, which may be communicated to controller 30.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the claims as interpreted according to the principles of patent law, including the doctrine of equivalents.

What is claimed is:

1. An exterior light control system for controlling exterior lights of a controlled vehicle, comprising:
   an imaging system configured to image a scene external and forward of the controlled vehicle and to generate image data corresponding to the acquired images; and
   a controller configured to receive and analyze the image data and for generating an exterior light control signal that is used to control the exterior lights in response to analysis of the image data and in response to a selected mode of operation,
   if said controller detects headlamps of one or more oncoming vehicle, said controller is configured to generate an exterior light control signal for reducing the brightness of the exterior lights, to determine a relative location within the acquired images of a headlamp closest to a central feature of the acquired images, and to select a delay that varies dynamically in response to the relative location of the headlamp, and wherein, upon determining that oncoming headlamps are no longer present in the acquired images that require the exterior lights to remain in a reduced brightness state, said controller is configured to nevertheless continue to analyze acquired images for the selected delay before generating an exterior light control signal for increasing the brightness of the exterior lights.

2. The exterior light control system of claim 1, wherein said controller detects whether light sources are AC light sources by utilizing upper and lower thresholds and wherein said controller adjusts the sensitivity between the first and second sensitivities by changing the upper and lower thresholds by an offset value.

3. The exterior light control system of claim 1, wherein if headlamps are detected during the delay, said controller will continue to analyze acquired images until such time that oncoming headlamps are no longer present in the acquired images a time period corresponding to the selected delay before generating an exterior light control signal for increasing the brightness of the exterior lights.

4. The exterior light control system of claim 1, wherein the closer the headlamp is to a central feature of the acquired images, the longer the selected delay.

5. The exterior light control system of claim 1, wherein the central feature of the acquired images is a center of optical flow of the acquired images.

6. The exterior light control system of claim 1, wherein the central feature of the acquired images is an actual center of the acquired images.

7. The exterior light control system of claim 1, wherein:
   one selected mode of operation is a motorway mode that is selected when the controlled vehicle is traveling on a motorway,
   wherein, when in the motorway mode, said controller is configured to select a delay that varies dynamically in response to the relative location of the headlamp, and
   wherein, when not in the motorway mode, if said controller detects headlamps of one or more oncoming vehicle, said controller is configured to generate an exterior light control signal for reducing the brightness of the exterior lights, and to select a static delay, and wherein, upon determining that oncoming headlamps are no longer present in the acquired images that require the exterior lights to remain in a reduced brightness state, said controller is configured to nevertheless continue to analyze acquired images for the static delay before generating an exterior light control signal for increasing the brightness of the exterior lights.

8. The exterior light control system of claim 1, wherein to determine a relative location within the acquired images of a headlamp closest to a central feature of the acquired images, said controller is configured to determine which headlamp is the rightmost headlamp in the images and to determine the relative location of the rightmost headlamp to central feature.

9. The exterior light control system of any of claim 1, wherein to determine a relative location within the acquired images of a headlamp closest to a central feature of the acquired images, said controller is configured to determine which headlamp is the leftmost headlamp in the images and to determine the relative location of the leftmost headlamp to central feature.

10. The exterior light control system of claim 9, wherein said controller determines a relative location within the acquired images of a headlamp closest to a central feature of the acquired images, and selects a delay that varies dynamically in response to the relative location of the headlamp, and wherein, upon determining that oncoming headlamps are no longer present in the acquired images that require the exterior lights to remain in a reduced brightness state, said controller nevertheless continues to analyze acquired images for the selected delay before generating an exterior light control signal for increasing the brightness of the exterior lights.

11. The exterior light control system of claim 10, wherein said controller determines a relative location within the acquired images of a headlamp closest to a central feature of the acquired images, and selects a delay that varies dynamically in response to the relative location of the headlamp, and wherein, upon determining that oncoming headlamps are no longer present in the acquired images that require the exterior lights to remain in a reduced brightness state, said controller nevertheless continues to analyze acquired images for the selected delay before generating an exterior light control signal for increasing the brightness of the exterior lights.

12. The non-transitory computer readable medium of claim 11, wherein the processor is configured to detect whether light sources are AC light sources by utilizing upper and lower thresholds and wherein the processor adjusts the sensitivity between the first and second sensitivities by changing the upper and lower thresholds by an offset value.

13. The non-transitory computer readable medium of claim 12, wherein the processor is configured to detect whether light sources are AC light sources by utilizing upper and lower thresholds and wherein the processor adjusts the sensitivity between the first and second sensitivities by changing the upper and lower thresholds by an offset value.

14. The non-transitory computer readable medium of claim 12, wherein if headlamps are detected during the delay, the processor will continue to analyze acquired images until such time that oncoming headlamps are no longer present in the acquired images a time period corresponding to the selected delay before generating an exterior light control signal for increasing the brightness of the exterior lights.

15. The non-transitory computer readable medium of claim 12, wherein the closer the headlamp is to a central feature of the acquired images, the longer the selected delay.

16. The non-transitory computer readable medium of claim 12, wherein the central feature of the acquired images is a center of optical flow of the acquired images.

17. The non-transitory computer readable medium of claim 12, wherein the central feature of the acquired images is an actual center of the acquired images.

18. The non-transitory computer readable medium of claim 12, wherein:
one selected mode of operation is a motorway mode that is selected when the controlled vehicle is traveling on a motorway,
wherein, when in the motorway mode, the processor is configured to select a delay that varies dynamically in response to the relative location of the headlamp, and
wherein, when not in the motorway mode, if the processor detects headlamps of one or more oncoming vehicle, the processor is configured to generate an exterior light control signal for reducing the brightness of the exterior lights and to select a static delay, and wherein, upon determining that oncoming headlamps are no longer present in the acquired images that require the exterior lights to remain in a reduced brightness state, the processor is configured to nevertheless continue to analyze acquired images for the static delay before generating an exterior light control signal for increasing the brightness of the exterior lights.

19. The non-transitory computer readable medium of claim 12, wherein the processor determines that the controlled vehicle is traveling on a motorway and selects a motorway mode when the controlled vehicle is traveling at a speed above a motorway speed threshold.

\* \* \* \* \*

UNITED STATES PATENT AND TRADEMARK OFFICE
CERTIFICATE OF CORRECTION

| | | |
|---|---|---|
| PATENT NO. | : 9,187,029 B2 | |
| APPLICATION NO. | : 14/503986 | |
| DATED | : November 17, 2015 | |
| INVENTOR(S) | : David J. Wright et al. | |

It is certified that error appears in the above-identified patent and that said Letters Patent is hereby corrected as shown below:

Claims

Column 12, lines 15-26, claim 10 should be:

--10. An exterior light control system for controlling exterior lights of a controlled vehicle, comprising:

an imaging system configured to image a scene external and forward of the controlled vehicle and to generate image data corresponding to the acquired images; and a controller configured to receive and analyze the image data and for generating an exterior light control signal that is used to control the exterior lights in response to analysis of the image data and in response to a selected mode of operation, wherein one selected mode of operation is a motorway mode that is selected when said controller determines that the controlled vehicle is traveling on a motorway, when not in the motorway mode, said controller is configured to detect whether light sources are AC light sources using a first sensitivity, when in the motorway mode, said controller is configured to detect whether light sources appearing on a left side of the acquired images and below a specified height are AC light sources using a second sensitivity that is lower than the first sensitivity while detecting whether light sources appearing in the remaining portions of the acquired images are AC light sources using the first sensitivity, and when in the motorway mode, if said controller detects headlamps of one or more oncoming vehicle, said controller is configured to generate an exterior light control signal for reducing the brightness of the exterior lights.--

Signed and Sealed this
Twelfth Day of July, 2016

Michelle K. Lee
*Director of the United States Patent and Trademark Office*

CERTIFICATE OF CORRECTION (continued)
U.S. Pat. No. 9,187,029 B2

Claims

Column 12, lines 38-43, claim 12 should be:

--12. A non-transitory computer readable medium having stored thereon software instructions that, when executed by a processor, cause the processor to generate control signals for controlling exterior lights of a controlled vehicle, by executing the steps comprising:

imaging a scene external and forward of the controlled vehicle and generating image data corresponding to the acquired images;

receiving and analyzing the image data in the processor;

generating a control signal from the processor that is used to control the exterior lights in response to analysis of the image data and in response to a selected mode of operation; and if the processor detects headlamps of one or more oncoming vehicle, the processor is configured to generate an exterior light control signal for reducing the brightness of the exterior lights, to determine a relative location within the acquired images of a headlamp closest to a central feature of the acquired images, and to select a delay that varies dynamically in response to the relative location of the headlamp, and wherein, upon determining that oncoming headlamps are no longer present in the acquired images that require the exterior lights to remain in a reduced brightness state, the processor is configured to nevertheless continue to analyze acquired images for the selected delay before generating an exterior light control signal for increasing the brightness of the exterior lights.--